US009827718B2

(12) United States Patent
Sun

(10) Patent No.: US 9,827,718 B2
(45) Date of Patent: Nov. 28, 2017

(54) THREE-DIMENSIONAL PRINTING DEVICE

(71) Applicants: XYZprinting, Inc., New Taipei (TW); Kinpo Electronics, Inc., New Taipei (TW); Cal-Comp Electronics & Communications Company Limited, New Taipei (TW)

(72) Inventor: Shou-Chih Sun, New Taipei (TW)

(73) Assignees: XYZprinting, Inc., New Taipei (TW); Kinpo Electronics, Inc., New Taipei (TW); Cal-Comp Electronics & Communications Company Limted, New Taipei (TW)

( * ) Notice: Subject to any disclaimer, the term of this patent is extended or adjusted under 35 U.S.C. 154(b) by 287 days.

(21) Appl. No.: 14/884,777

(22) Filed: Oct. 16, 2015

(65) Prior Publication Data
US 2017/0028646 A1 Feb. 2, 2017

(30) Foreign Application Priority Data
Jul. 31, 2015 (CN) .......................... 2015 1 0464898

(51) Int. Cl.
*B29C 67/00* (2017.01)
*B33Y 30/00* (2015.01)
*B33Y 50/02* (2015.01)
*B33Y 99/00* (2015.01)

(52) U.S. Cl.
CPC ...... *B29C 67/0088* (2013.01); *B29C 67/0059* (2013.01); *B29C 67/0096* (2013.01); *B33Y 30/00* (2014.12); *B33Y 50/02* (2014.12); *B33Y 99/00* (2014.12)

(58) Field of Classification Search
CPC ......... B33Y 50/00; B33Y 50/02; B33Y 33/00; B33Y 10/00; B29C 64/343; B29C 64/386; B29C 64/393; B29C 64/106; B29C 64/118; B29C 67/0088; B29C 67/0059; B29C 67/0096
See application file for complete search history.

(56) References Cited

U.S. PATENT DOCUMENTS

| 6,907,307 | B2 | 6/2005 | Chen | |
|---|---|---|---|---|
| 9,662,840 | B1 * | 5/2017 | Buller | ................ B29C 67/0088 |
| 9,676,145 | B2 * | 6/2017 | Buller | ................ B29C 67/0085 |
| 2013/0177972 | A1 * | 7/2013 | Green | .................... C12M 21/08 |
| | | | | 435/288.7 |

(Continued)

*Primary Examiner* — Jason L Lazorcik
(74) *Attorney, Agent, or Firm* — JCIPRNET

(57) ABSTRACT

A 3D printing device is provided. The 3D printing device is adapted to print a 3D object including a plurality of layer objects. The 3D printing device includes a weight sensor, which is configured to measure an actual weight value of the layer objects formed on a carrying surface or configured to measure an actual weight value of a feed tray. A controller of the 3D printing device estimates an ideal weight value corresponding to a first layer object according to a printing sequence of the first layer object in the layer objects. The controller receives the actual weight value corresponding to the first layer object from the weight sensor, and compares the ideal weight value with the actual weight value to determine whether printing abnormity is occurred. According to the disclosure, the printing quality of the 3D printing device is improved.

14 Claims, 5 Drawing Sheets

(56) References Cited

U.S. PATENT DOCUMENTS

| | | | |
|---|---|---|---|
| 2013/0310965 A1* | 11/2013 | Schouwenburg | G06F 17/50 700/119 |
| 2017/0050382 A1* | 2/2017 | Minardi | B33Y 10/00 |
| 2017/0056970 A1* | 3/2017 | Chin | B33Y 30/00 |
| 2017/0057161 A1* | 3/2017 | Kuk | B29C 67/0059 |
| 2017/0124223 A1* | 5/2017 | Maeda | G06F 17/50 |
| 2017/0129184 A1* | 5/2017 | Buller | B29C 67/0059 |
| 2017/0144254 A1* | 5/2017 | Buller | B23K 26/342 |

* cited by examiner

THREE-DIMENSIONAL PRINTING DEVICE

CROSS-REFERENCE TO RELATED APPLICATION

This application claims the priority benefit of China patent application serial no. 201510464898.2, filed on Jul. 31, 2015. The entirety of the above-mentioned patent application is hereby incorporated by reference herein and made a part of the specification.

BACKGROUND

Technical Field

The disclosure relates to a printing device. Particularly, the disclosure relates to a three-dimensional (3D) printing device.

Related Art

Along with progress of computer-aided manufacturing (CAM), manufacturing industry has developed a three-dimensional (3D) printing technology, by which an original design conception can be quickly manufactured. The 3D printing technology is actually a general designation of a series of rapid prototyping (RP) techniques, and a basic principle thereof is additive manufacturing, where a RP machine is used to form sectional shapes of a workpiece in an X-Y plane through scanning, and intermittently shift by a layer thickness along a Z-axis, so as to form a 3D object. The 3D printing technology is not limited to any geometric shape, and the more complex the workpiece is, the more excellence the RP technology is demonstrated. The 3D printing technology can greatly save manpower and a processing time, and under a demand of the shortest time, a digital 3D model designed by software of 3D computer-aided design (CAD) can be truly presented as a physical part, which is not only touchable, a user can also actually feel a geometric curve of the physical part, and test assemblability of the physical part or even perform possible functional tests.

Methods of forming a plurality of thin cross-sectional layers have been developed. For example, a printing head generally moves along X-Y coordinates above a base according to X-Y-Z coordinates constructed according to design data of a 3D model, and sprays a printing material to form a correct cross-sectional layer shape. The deposited material can be cured to form the required cross-sectional layers, and a 3D object is printed as the deposited material is cured layer-by-layer. However, during the process of 3D printing, a nozzle spraying the printing material is probably jammed gradually or a foreign matter may accidentally enter the nozzle, which may result in a fact that the nozzle is unable to provide an expected amount of material to influence printing quality. Therefore, in case that a user is unaware of a jamming situation of the nozzle, to continually print the 3D object may cause failure of the 3D printing and cause a waste of the printing material.

SUMMARY

The disclosure is directed to a 3D printing device, which is able to determine whether printing abnormality is occurred by measuring a weight of a feed tray or a weight on a printing platform, so as to improve printing quality of 3D printing.

The disclosure provides a 3D printing device, which is adapted to print a 3D object. The 3D printing device includes a platform, at least one feed tray, at least one nozzle, a weight sensor and a controller. The platform includes a carrying surface, and the feed tray is disposed above the platform and is filled with at least one printing material. The nozzle is disposed above the platform, and is configured to spray the printing material on the carrying surface, such that a plurality of layer objects of the 3D object is formed on the carrying surface layer-by-layer. The weight sensor is disposed on the platform, and is configured to measure an actual weight value of the layer objects formed on the carrying surface. The controller is coupled to the nozzle and the weight sensor, and estimates an ideal weight value corresponding to a first layer object according to a printing sequence of the first layer object in the layer objects. The controller receives the actual weight value corresponding to the first layer object from the weight sensor, and compares the ideal weight value with the actual weight value to determine whether printing abnormity is occurred.

The disclosure provides a 3D printing device, which is adapted to print a 3D object. The 3D printing device includes a platform, at least one feed tray, at least one nozzle, a weight sensor and a controller. The platform includes a carrying surface, and the feed tray is disposed above the platform and is filled with at least one printing material. The nozzle is disposed above the platform, and is configured to spray the printing material on the carrying surface, such that a plurality of layer objects of the 3D object is formed on the carrying surface layer-by-layer. The weight sensor is disposed on the feed tray, and is configured to measure an actual weight value of the feed tray. The controller is coupled to the nozzle and the weight sensor, and estimates an ideal weight value of the feed tray according to a printing sequence of a first layer object in the layer objects, where the ideal weight value corresponds to the first layer object. When the first layer object is formed on the carrying surface, the controller receives the actual weight value of the feed tray corresponding to the first layer object from the weight sensor, and compares the ideal weight value with the actual weight value to determine whether printing abnormity is occurred.

According to the above descriptions, the 3D printing device of the disclosure has a weight sensor, and the weight sensor obtains a weight of the feed tray or a weight on the platform. In this way, the 3D printing device first estimates an ideal weight value according to a 3D printing model, and determines whether the ideal weight value is complied with an actual weight value during the printing period, so as to determine whether printing abnormity is occurred. When the nozzle is jammed by the printing material and cannot smoothly feed the printing material, the 3D printing device may detect that the nozzle is unable to provide an expected amount of material in real-time during the printing period, and stops the printing to send an alert to the user. In this way, the user executes a further operation according to the alert of the 3D printing device, so as to avoid continuous printing in case that the nozzle is jammed. Therefore, practicality of the 3D printing device in use and operation is indeed improved, so as to reduce the waste of the printing material.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
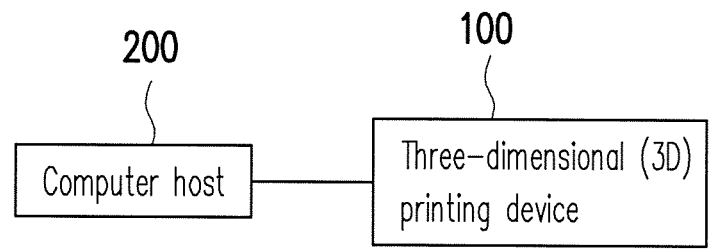
FIG. 1 is a block schematic diagram of a working situation of a 3D printing device according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

FIG. 1 is a block schematic diagram of a working situation of a 3D printing device according to an embodiment of the disclosure. Referring to FIG. 1, the 3D printing device 100 of the present embodiment is adapted to print a 3D object according to 3D model information. Further, the computer host 200 is a device having computation capability, which is, for example, a computer device such as a notebook computer, a tablet computer or a desktop computer, etc., and the type of the computer host 200 is not limited by the disclosure. The computer host 200 may edit and process a 3D model of a 3D object and transmit related 3D model information to the 3D printing device 100, and the 3D printing device 100 may print the 3D object according to the 3D model information. In the present embodiment, the 3D model information can be 3D digital image information, which is, for example, constructed by the computer host 200 by using computer-aided design (CAD) or animation modelling software, etc., and the digital 3D model information is cut into a plurality of cross-sectional information, and the 3D printing device 100 may sequentially acquire a plurality of layer objects according to the cross-sectional information of the 3D model information, where the layer objects are stacked to form the 3D object.

Figure 2:
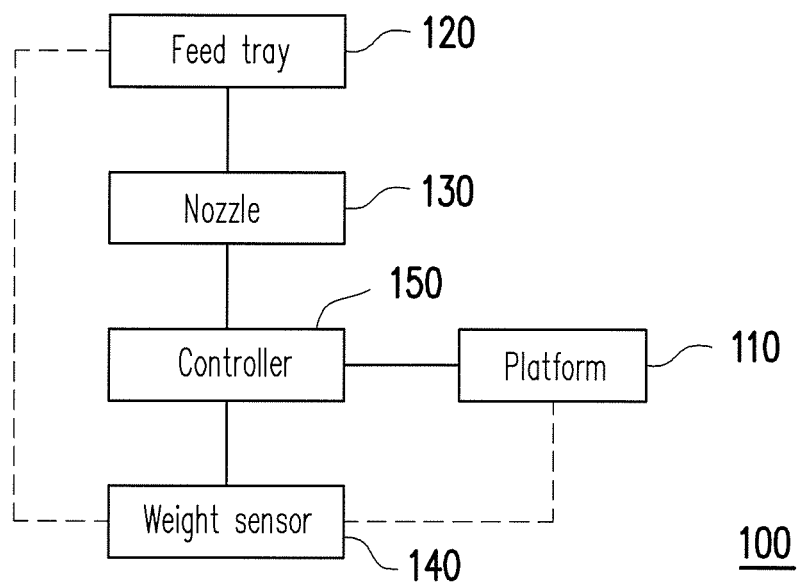
FIG. 2 is a block schematic diagram of a 3D printing device according to an embodiment of the disclosure.

FIG. 2 is a block schematic diagram of the 3D printing device according to an embodiment of the disclosure. Referring to FIG. 2, the 3D printing device 100 includes a platform 110, a feed tray 120, a nozzle 130, a weight sensor 140 and a controller 150, and functions thereof are as follows.

The platform 110 includes a carrying surface, which is configured to carry the printed 3D object. In other words, the layer objects are staked on the carrying surface of the platform 110 layer-by-layer. The feed tray 120 is disposed above the platform 110 and is filled with at least one printing material. The nozzle 130 is movably disposed above the platform 110, and is configured to spray the printing material in the feed tray 120 on the carrying surface. In other words, the feed tray 120 contains the printing material and is connected to the nozzle 130, so as to transport the printing material in the feed tray 120 to the nozzle 130. Here, the printing material in the feed tray 141 is, for example, a light-cured resin. It should be noted that although one nozzle 130 is taken as an example for description in the present embodiment, the disclosure is not limited thereto. In other embodiments, the number of the nozzles can be more than one. Similarly, although one feed tray 120 is taken as an example for description in the present embodiment, the disclosure is not limited thereto. In other embodiments, the number of the feed trays can be more than one, and the feed trays may contain printing materials with different properties.

The weight sensor 140 coupled to the controller 150, and is configured to measure a weight of the feed tray 120 or a weight carried by the carrying surface according to a configuration position thereof. For example, if the weight sensor 140 is disposed on the feed tray 120, the weight sensor 140 can measure an actual weight value of the feed tray 120 at anytime. On the other hand, if the weight sensor 140 is disposed on the platform 110, the weight sensor 140 can measure an actual weight value carried by the carrying surface of the platform 110 at anytime.

Moreover, the controller 150 is coupled to the platform 110, the nozzle 130 and the weight sensor 140, and is configured to read 3D model information and control a whole operation of the 3D printing device to print a 3D object according to the 3D model information. For example, the controller 150 may control a moving path of the nozzle 130 according to the 3D model information. The controller 150 is, for example, a device having a computation function such as a central processor, a chipset, a microprocessor, an embedded controller, etc., which is not limited by the disclosure. In detail, the controller 150 controls the nozzle 130 according to the 3D model information, so as to form a plurality of layer objects on the carrying surface of the platform 110 to construct the 3D object including the layer objects.

According to the above description, the controller 150 may learn a amount of the layer objects according to the 3D model information, and may learn a printing sequence of each of the layer objects, where the printing sequence of the layer object represents an order that the layer object is formed on the platform. For example, the printing sequence of the first layer object is the earliest, and the first layer object contacts the platform 110, and the printing sequence of the first layer object is earlier than that of the second layer object, and the second layer object is stacked on the first layer object.

In this way, the controller 150 can control the nozzle 130 to move and spray the printing material on the platform 110 according to a cross-sectional area corresponding to each of the layer objects in the 3D model information, such that the layer objects of the 3D object are formed on the carrying surface layer-by-layer. It should be noted that the controller 150 may calculate a single layer weight value of each of the layer objects according to the 3D model information. For example, when the 3D printing device 100 is a material jetting 3D printing device, the nozzle 130 may spray the 3D material in a lattice manner, and the deposited printing material can be a liquid state or slurry state photosensitive resin. To be specific, the controller 150 controls the nozzle 130 to move to corresponding positions according to coordinates of a plurality of printing pixel points on a printing plane. Then, the nozzle 130 directly sprays the printing material on the carrying surface of the platform 110, so as to form the required layer object through a subsequent natural hardening process or after the printing material is cured by a specific light source. Therefore, the liquid state or slurry state photosensitive resin can be cured on the carrying surface layer-by-layer to form the 3D object.

Namely, the controller 150 may obtain a plurality of printing pixel points of each layer object according to the 3D model information. Therefore, the controller 150 may calculate a single layer weight value of each of the layer objects according to the number of the printing pixel points of each layer object and a unit weight value of the printing material. Moreover, according to the single layer weight value of each of the layer objects estimated by the controller 150, the controller 150 may estimate an ideal weight value according to the single layer weight value of each of the layer objects. In brief, in the embodiment of the disclosure, the ideal weight value is a weight parameter estimated by the controller 150 according to the 3D model information. In the embodiment of the disclosure, the controller 150 may estimate the ideal weight value of the feed tray 120 during the printing period, and may also estimate an ideal weight value of a part of the 3D object formed on the platform 110.

Therefore, the controller 150 compares the ideal weight value with the actual weight value to determine whether printing abnormity is occurred. In brief, the controller 150 may determine whether the ideal weight value is complied with the actual weight value measured by the weight sensor 140. Once the ideal weight value is not complied with the actual weight value measured by the weight sensor 140, the controller 150 determines that the printing abnormity is occurred, and controls to stop printing.

Figure 3:
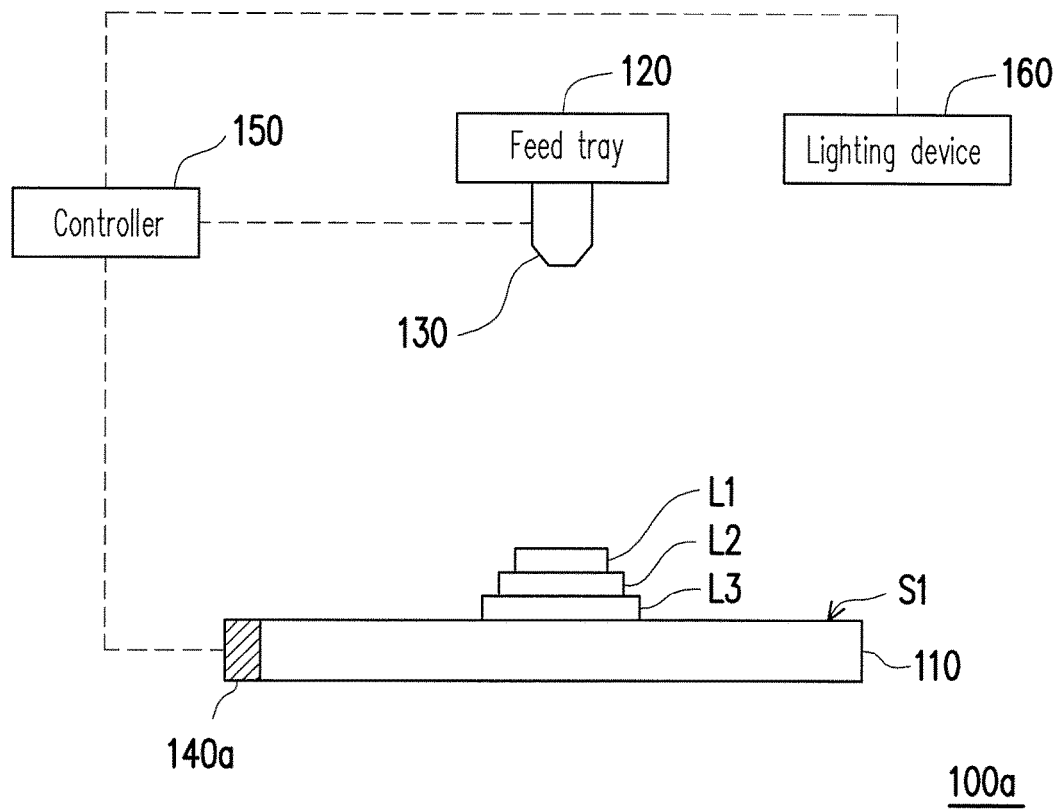
FIG. 3 is a schematic diagram of a 3D printing device according to an embodiment of the disclosure.
Figure 4:
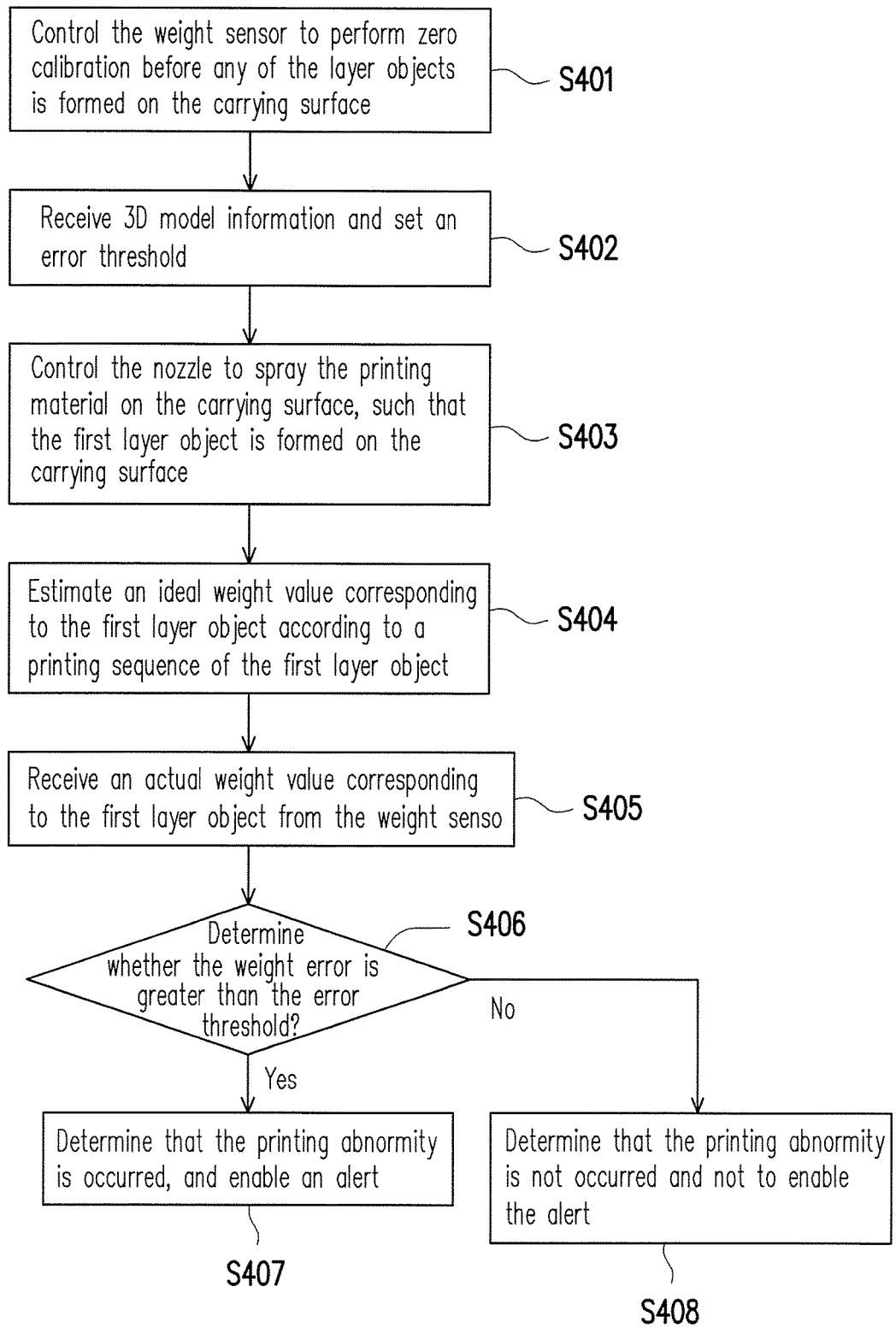
FIG. 4 is a flowchart illustrating a method for detecting printing abnormity according to an embodiment of the disclosure.

In order to describe the disclosure in detail, the situations that the weight sensor is disposed on the platform and on the feed tray are respectively described below. FIG. 3 is a schematic diagram of the 3D printing device according to an embodiment of the disclosure. FIG. 4 is a flowchart illustrating a method for detecting printing abnormity according to an embodiment of the disclosure. The method for detecting the printing abnormity of the present embodiment is adapted to the 3D printing device 100a of FIG. 3, and detailed steps of the method are described below with reference of various component and modules of the 3D printing device 100a.

Referring to FIG. 3, the 3D printing device 100a includes the platform 110, the feed tray 120, the nozzle 130, a weight sensor 140a, a lighting device 160 and the controller 150. Cartesian coordinates are provided to facilitate describe related components and moving states thereof. The weight sensor 140a is disposed on the platform 110, and is configured to measure a weight carried by the carrying surface S1. The lighting device 160 emits a light (for example, an ultraviolet light) towards the carrying surface S1 to cure the printing material sprayed on the carrying surface S1 by the nozzle 130. For example, the controller 150 controls the nozzle 130 to move along an XY plane and spray the printing material on the carrying surface S1 according to the 3D model information, and a layer object L3 is first cured on the carrying surface S1 through irradiation of the lighting device 160. Then, after the nozzle 130 moves away from the carrying surface S1 by a height of one layer along a Z-axis, the controller 150 again controls the nozzle 130 to move along the XY plane and spray the printing material on the carrying surface S1 according to the 3D model information, and a layer object L2 is cured and stacked on the layer object L3 through irradiation of the lighting device 160. It should be noted that the weight sensor 140a may measure an actual weight value of the layer object formed on the carrying surface S1. In the example of FIG. 3, the weight sensor 140a may measure the actual weight values of all of the layer objects L1-L3 formed on the carrying surface S1.

Referring to FIG. 3 and FIG. 4, in step S401, before any of the layer objects is formed on the carrying surface S1, the controller 150 controls the weight sensor 140a to perform zero calibration, so as to set the actual weight value measured by the weight sensor 140a to zero. In step S402, the controller 150 receives the 3D model information and sets an error threshold. For example, the controller 150 may acquire coordinate positions of the printing pixel points of each layer object. Moreover, the error threshold can be preset, set by the user or obtained through other calculations or experiments, which is not limited by the disclosure.

In step S403, the controller 150 controls the nozzle 130 to spray the printing material on the carrying surface S1, such that the first layer object L1 is formed on the carrying surface S1. In step S404, the controller 150 estimates an ideal weight value corresponding to the first layer object L1 according to a printing sequence of the first layer object L1. In detail, the controller 150 may multiply the number of the printing pixel points of the layer object by at least one unit weight value to obtain a single layer weight value of the layer object. It is known that a weight of a single printing pixel point is the unit weight value, and the unit weight value can be different along with different material properties of the printing material. To be specific, the higher the density of the printing material is, the higher the unit weight value is. In the present example, the control unit 150 adds the single weight value of the first layer object L1 with a previous accumulative weight to estimate the ideal weight value corresponding to the first layer object L1. The previous accumulative weight is a sum of the single weight values of all of the layer objects L2-L3 with the printing sequences earlier than the printing sequence of the first layer object L1. In other words, the ideal weight value corresponding to the first layer object L1 is a sum of the single layer weight values of the currently printed layer objects L1-L3.

In step S405, the controller 150 receives an actual weight value corresponding to the first layer object L1 from the weight sensor 140a, i.e. the actual weight currently carried by the carrying surface S1. In step S406, the controller 150 determines whether a weight error is greater than the error threshold. In detail, the controller 150 calculates a difference between the ideal weight value and the actual weight value to obtain the weight error corresponding to the first layer object L1, and determines whether the weight error is greater than the error threshold to determine whether the printing abnormity is occurred. When the weight error is greater than the error threshold, in step S407, the controller 150 determines that the printing abnormity is occurred, and enables an alert. Moreover, in another embodiment, when the weight error is greater than the error threshold, the controller 150 may stop the printing procedure of the 3D object and start a nozzle cleaning procedure of the nozzle 130 to clean up the residual material on the nozzle 130. On the other hand, when the weight error is not greater than the error threshold, in step S408, the controller 150 determines that the printing abnormity is not occurred and does not enable the alert.

It should be noted that in an embodiment, the printing material may include a first material and a second material different to each other, and the first layer object is constructed by the first material and the second material. In this case, the controller 150 estimates the ideal weight value corresponding to the first layer object according to a material property of the first material and a material property of the second material. For example, the first material is a constructing material used for constructing the 3D object, and the second material is a supporting material used for forming a supporter. A following table 1 is an example of ideal weight values.

TABLE 1

| Printing sequence of the layer objects | Number of the printing pixel points of the constructing material | Unit point weight of the constructing material (gram) | Number of the printing pixel points of the supporting material | Unit point weight of the supporting material (gram) | Single layer weight value (gram) | Ideal weight value (gram) |
|---|---|---|---|---|---|---|
| 1 | 1000 | 0.004 | 6612 | 0.012 | 83.344 | 83.344 |
| 2 | 5000 | 0.004 | 7756 | 0.012 | 113.072 | 196.416 |
| 3 | 4456 | 0.004 | 200 | 0.012 | 20.224 | 216.640 |
| 4 | 2177 | 0.004 | 5999 | 0.012 | 80.696 | 297.336 |
| 5 | 9982 | 0.004 | 1230 | 0.012 | 54.688 | 352.024 |
| 6 | 5003 | 0.004 | 5595 | 0.012 | 87.152 | 439.176 |
| 7 | 100 | 0.004 | 2264 | 0.012 | 27.568 | 466.744 |
| 8 | 675 | 0.004 | 4520 | 0.012 | 56.940 | 523.684 |
| 9 | 1559 | 0.004 | 965 | 0.012 | 17.816 | 541.500 |
| 10 | 2008 | 0.004 | 2255 | 0.012 | 35.092 | 576.592 |

In the example of the table 1, the single layer weight value includes a single layer weight of the constructing material plus a single layer weight of the supporting material. For example, based on the ideal weight values of the table 1, when the 3D printing device 100a completes printing the layer object with a printing sequence of "5", if a difference between the actual weight value measured by the weight sensor 140a and the ideal weight value "352.024" is too large (for example, greater than the error threshold), the controller 150 determines that the printing abnormity is occurred. However, the table 1 is only an example, and is not used for limiting the disclosure.

Figure 5:
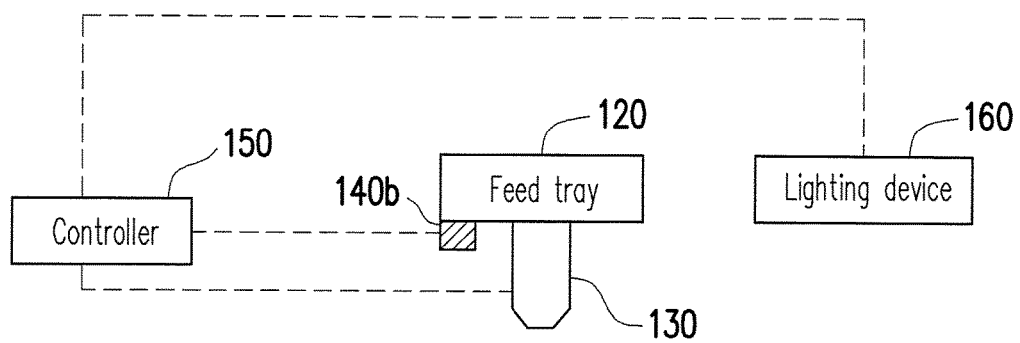
FIG. 5 is a schematic diagram of a 3D printing device according to an embodiment of the disclosure.
Figure 5:
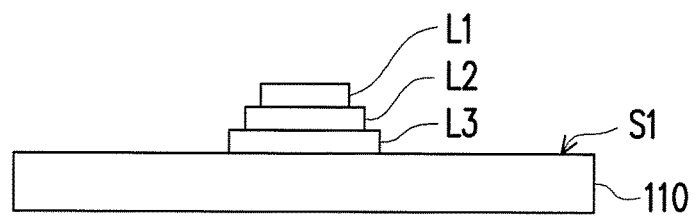
Figure 5:
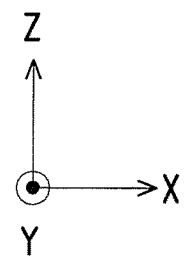
Figure 6:
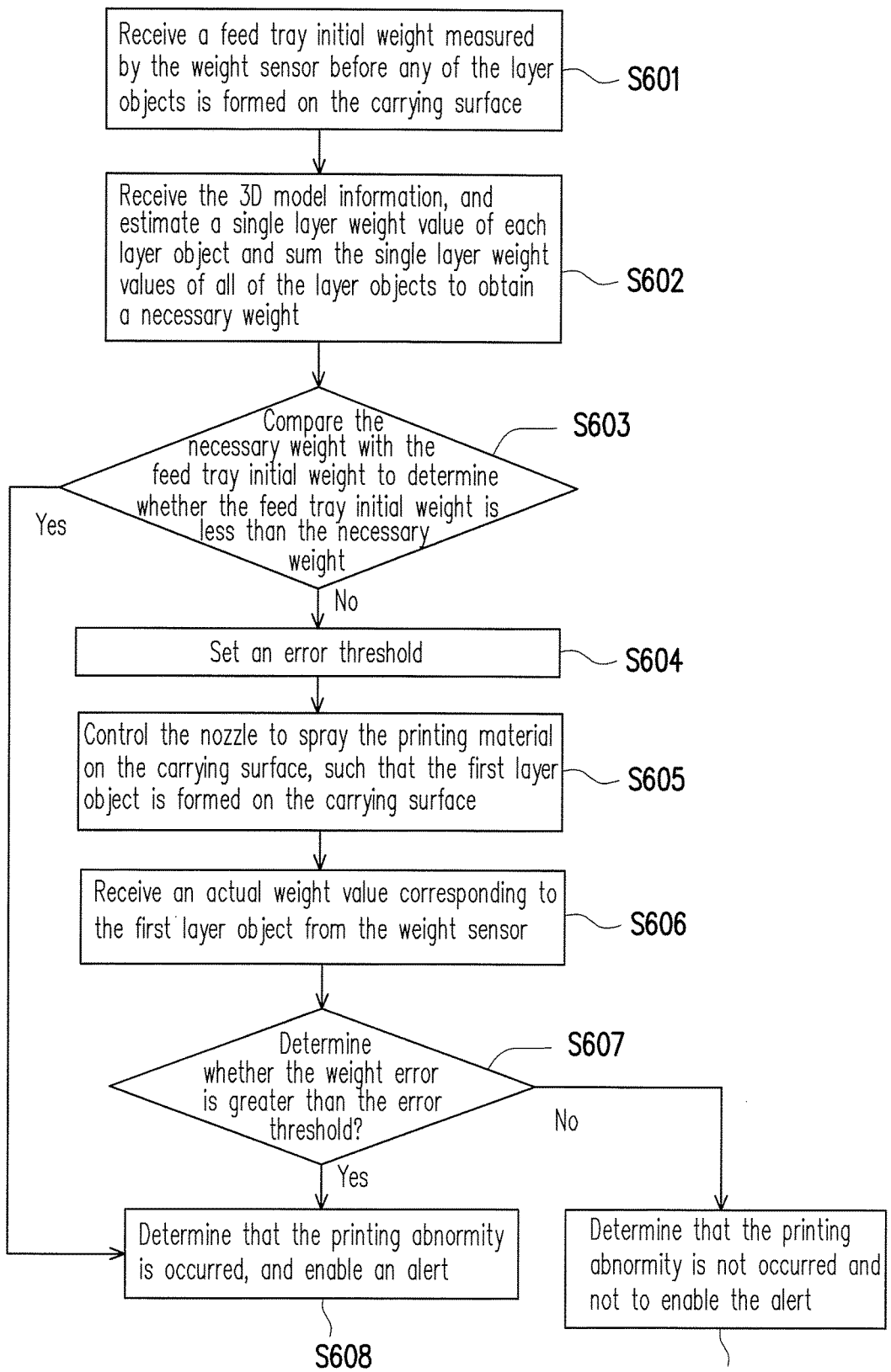
FIG. 6 is a flowchart illustrating a method for detecting printing abnormity according to an embodiment of the disclosure.

FIG. 5 is a schematic diagram of the 3D printing device according to an embodiment of the disclosure. FIG. 6 is a flowchart illustrating a method for detecting printing abnormity according to an embodiment of the disclosure. The method for detecting the printing abnormity of the present embodiment is adapted to the 3D printing device 100b of FIG. 5, and detailed steps of the method are described below with reference of various component and modules of the 3D printing device 100b.

The 3D printing device 100b of FIG. 5 is similar to the 3D printing device 100a of FIG. 3, and an only difference therebetween is that the weight sensor 140b of the 3D printing device 100b is disposed on the feed tray 120 while the weight sensor 140a of the 3D printing device 100a is disposed on the platform 110. The printing operation and flow of the 3D printing device 100b may refer to related description of FIG. 3, and details thereof are not repeated. In the embodiment of FIG. 5, the weight sensor 140a may measure an actual weight value of the feed tray 120. The controller 150 may estimate an ideal weight value of the feed tray 120 according to the printing sequences of the layer objects. When the first layer object is formed on the carrying surface S1, the controller 150 receives the actual weight value of the feed tray 120 corresponding to the first layer object from the weight sensor 140b, and compares the ideal weight value with the actual weight value to determine whether the printing abnormity is occurred.

Further, referring to FIG. 5 and FIG. 6, in step S601, before any of the layer objects is formed on the carrying surface S1, the controller 150 receives a feed tray initial weight measured by the weight sensor 140b. In step S602, the controller 150 receives the 3D model information, and estimates a single layer weight value of each layer object and sums the single layer weight values of all of the layer objects to obtain a necessary weight. For example, the controller 150 may acquire coordinate positions of the printing pixel points of each layer object. In this way, the controller 150 may multiply the number of the printing pixel points of the layer object by the unit weight value to obtain a single layer weight value of the layer object. Moreover, the necessary weight is a sum of the single layer weight values of all of the layer objects.

It should be noted that in the present embodiment, the controller 150 subtracts the feed tray initial weight by the single layer weight value of the first layer object and the previous accumulative weight to estimate the ideal weight value corresponding to the feed tray 120. The aforementioned feed tray initial weight is an initial weight of the feed tray 120 before the 3D object is printed, and the controller 150 may obtain the feed tray initial weight from the weight sensor 140b before the 3D object is printed. Moreover, the previous accumulative weight is a sum of the single weight values of all of the layer objects with the printing sequences earlier than the printing sequence of the first layer object. In the embodiment of FIG. 5, the controller 150 subtracts the feed tray initial weight by the single layer weight value of the first layer object L1 and the previous accumulative weight to estimate the ideal weight value of the feed tray 120. The previous accumulative weight is a sum of the single weight values of all of the layer objects L2-L3 with the printing sequences earlier than the printing sequence of the first layer object L1.

Then, in step S603, the controller 150 compares the necessary weight with the feed tray initial weight to determine whether the feed tray initial weight is less than the necessary weight. If the determination result of the step S603 is affirmative, it represents that the printing material in the feed tray 120 is not enough to print the integral 3D object. Therefore, in step S608, the controller 150 determines that the printing abnormity is occurred and enables the alert. On the other hand, if the determination result of the step S603 is negative, in step S604, the controller 150 sets an error threshold. The error threshold can be preset, set by the user or obtained through other calculations or experiments, which is not limited by the disclosure. In step S605, the controller controls the nozzle 130 to spray the printing material on the carrying surface S1, such that the first layer object L1 is formed on the carrying surface S1.

In step S606, the controller 150 receives an actual weight value corresponding to the first layer object L1 from the weight sensor 140b, i.e. an actual remaining of the feed tray 120. In step S607, the controller 150 determines whether a weight error is greater than the error threshold. In detail, the controller 150 calculates a difference between the ideal weight value and the actual weight value to obtain the weight error corresponding to the first layer object L1, and determines whether the weight error is greater than the error threshold to determine whether the printing abnormity is occurred. When the weight error is greater than the error threshold, in step S608, the controller 150 determines that the printing abnormity is occurred, and enables the alert. On the other hand, when the weight error is not greater than the error threshold, in step S609, the controller 150 determines that the printing abnormity is not occurred and does not enable the alert.

The table 2 is an example of the ideal weight values, in the example of the table 2, it is assumed that the feed tray initial weight of the feed tray is 1500 grams.

TABLE 2

| Printing sequence of layer object | Single layer weight value (gram) | Previous accumulative weight (gram) | Ideal weight value of feed tray (gram) |
|---|---|---|---|
| 1 | 83.344 | 0.000 | 1,416.656 |
| 2 | 113.072 | 83.344 | 1,303.584 |
| 3 | 20.224 | 196.416 | 1,283.360 |
| 4 | 80.696 | 216.640 | 1,202.664 |
| 5 | 54.688 | 297.336 | 1,147.976 |
| 6 | 87.152 | 352.024 | 1,060.824 |
| 7 | 27.568 | 439.176 | 1,033.256 |
| 8 | 56.940 | 466.744 | 976.316 |
| 9 | 17.816 | 523.684 | 958.500 |
| 10 | 35.092 | 541.500 | 923.408 |

In the example of FIG. 2, it is known that the layer object corresponding to the printing sequence of "5" corresponds to an ideal weight value "1147.976", and the ideal weight value "1147.976" is obtained by subtracting the feed tray initial weight by the single layer weight value of the layer object corresponding to the printing sequence of "5" and the previous accumulative value. For example, based on the ideal weight values of the table 2, when the 3D printing device 100a completes printing the layer object with the printing sequence of "5", if a difference between the actual weight value measured by the weight sensor 140b and the ideal weight value "1147.976" is too large (for example, greater than the error threshold), the controller 150 determines that the printing abnormity is occurred. However, the table 2 is only an example, and is not used for limiting the disclosure.

When the nozzle is jammed or a foreign matter enters the nozzle, the amount of material sprayed by the nozzle is decreased to influence the printing quality, or even the nozzle is completely blocked to cause printing abnormity. Therefore, in the disclosure, a printing state can be determined by measuring the weight of the printed object during the printing period.

In summary, in the aforementioned embodiments of the disclosure, the 3D printing device acquires an actual weight value of the feed tray or an actual weight value carried by the carrying surface. Therefore, the 3D printing device may compare the ideal weight value estimated according to the 3D model information with the actual weight value to determine whether the printing abnormity is occurred. When the 3D printing device determines that the printing abnormity is occurred, the 3D printing device may send an alert to the user or directly stops the printing procedure. In this way, the 3D printing device is avoided to continue the printing procedure in case that the nozzle is jammed, so as to decrease waste of the printing material and waste of time, and accordingly improve the printing quality of the 3D printing device.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A three-dimensional (3D) printing device, adapted to print a 3D object, the 3D printing device, comprising:
a platform, comprising a carrying surface;
at least one feed tray, disposed above the platform, and filled with at least one printing material;
at least one nozzle, disposed above the platform, and configured to spray the at least one printing material on the carrying surface, such that a plurality of layer objects of the 3D object is forming on the carrying surface layer-by-layer;
a weight sensor, disposed on the platform, and configured to measure an actual weight value of the layer objects formed on the carrying surface; and
a controller, coupled to the at least one nozzle and the weight sensor, and estimating an ideal weight value corresponding to a first layer object according to a printing sequence of the first layer object in the layer objects,
wherein the controller receives the actual weight value corresponding to the first layer object from the weight sensor, and compares the ideal weight value with the actual weight value to determine whether printing abnormity is occurred.

2. The 3D printing device as claimed in claim 1, wherein the at least one printing material comprises a first material and a second material, the controller estimates the ideal weight value corresponding to the first layer object according to a material property of the first material and a material property of the second material.

3. The 3D printing device as claimed in claim 1, wherein the controller calculates a difference between the ideal weight value and the actual weight value to obtain a weight error corresponding to the first layer object, and determines whether the weight error is greater than an error threshold, so as to determine whether the printing abnormity is occurred.

4. The 3D printing device as claimed in claim 3, wherein when the weight error is greater than the error threshold, the controller determines that the printing abnormity is occurred and enables an alert; and when the weight error is not greater than the error threshold, the controller determines that the printing abnormity is not occurred and does not enable the alert.

5. The 3D printing device as claimed in claim 1, wherein the controller multiplies the number of printing pixel points of the layer object by at least one unit weight value to obtain a single layer weight value of the layer object, and the controller adds the single layer weight value of the first layer object with a previous accumulative weight to estimate the ideal weight value corresponding to the first layer object, wherein the previous accumulative weight is a sum of the single weight values of all of the layer objects with the printing sequences earlier than the printing sequence of the first layer object.

6. The 3D printing device as claimed in claim 1, wherein before any of the layer objects is formed on the carrying surface, the controller controls the weight sensor to perform zero calibration.

7. The 3D printing device as claimed in claim 1, wherein after the controller determines that the printing abnormity is occurred, the controller stops a printing procedure of the 3D object and enables a nozzle cleaning procedure of the at least one nozzle.

8. A 3D printing device, adapted to print a 3D object, the 3D printing device comprising:
   a platform, comprising a carrying surface;
   at least one feed tray, disposed above the platform, and filled with at least one printing material;
   at least one nozzle, disposed above the platform, and configured to spray the at least one printing material on the carrying surface, such that a plurality of layer objects of the 3D object is formed on the carrying surface layer-by-layer;
   a weight sensor, disposed on the feed tray, and configured to measure an actual weight value of the feed tray; and
   a controller, coupled to the at least one nozzle and the weight sensor, and estimating an ideal weight value of the feed tray according to a printing sequence of a first layer object in the layer objects, wherein the ideal weight value corresponds to the first layer object,
   wherein when the first layer object is formed on the carrying surface, the controller receives the actual weight value of the feed tray corresponding to the first layer object from the weight sensor, and compares the ideal weight value with the actual weight value to determine whether printing abnormity is occurred.

9. The 3D printing device as claimed in claim 8, wherein the controller calculates a difference between the ideal weight value and the actual weight value to obtain a weight error corresponding to the first layer object, and determines whether the weight error is greater than an error threshold, so as to determine whether the printing abnormity is occurred.

10. The 3D printing device as claimed in claim 9, wherein when the weight error is greater than the error threshold, the controller determines that the printing abnormity is occurred and enables an alert; and when the weight error is not greater than the error threshold, the controller determines that the printing abnormity is not occurred and does not enable the alert.

11. The 3D printing device as claimed in claim 8, wherein the controller multiplies the number of printing pixel points of the layer object by at least one unit weight value to obtain a single layer weight value of the layer object, and the controller subtracts a feed tray initial weight by the single layer weight value of the first layer object and a previous accumulative weight to estimate the ideal weight value relative to the feed tray, wherein the previous accumulative weight is a sum of the single weight values of all of the layer objects with the printing sequences earlier than the printing sequence of the first layer object.

12. The 3D printing device as claimed in claim 11, wherein before any of the layer objects is formed on the carrying surface, the controller receives the feed tray initial weight measured by the weight sensor.

13. The 3D printing device as claimed in claim 12, wherein the controller sums the single layer weight values of all of the layer objects to obtain a necessary weight, and compares the necessary weight with the feed tray initial weight, wherein when the feed tray initial weight is less than the necessary weight, the controller stops printing the 3D object.

14. The 3D printing device as claimed in claim 8, wherein after the controller determines that the printing abnormity is occurred, the controller stops a printing procedure of the 3D object and enables a nozzle cleaning procedure.

* * * * *